United States Patent
Alex et al.

(10) Patent No.: US 8,924,574 B2
(45) Date of Patent: *Dec. 30, 2014

(54) APPARATUS, SYSTEMS, AND METHODS FOR IP REACHABILITY IN A COMMUNICATIONS NETWORK

(71) Applicant: Cisco Technology, Inc., San Jose, CA (US)

(72) Inventors: Arun C. Alex, Nashua, NH (US); Rajesh Ramankutty, Westford, MA (US); Stinson Mathai, Flower Mound, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,041

(22) Filed: Jan. 15, 2014

(65) Prior Publication Data
US 2014/0129728 A1     May 8, 2014

Related U.S. Application Data

(63) Continuation of application No. 13/273,039, filed on Oct. 13, 2011, now Pat. No. 8,661,146.

(51) Int. Cl.
*G06F 15/16*     (2006.01)
*H04L 29/12*     (2006.01)

(52) U.S. Cl.
CPC ........ *H04L 61/2503* (2013.01); *H04L 61/1511* (2013.01); *H04L 61/1588* (2013.01); *H04L 61/2567* (2013.01)
USPC ........... 709/228; 709/227; 709/230; 709/245; 370/352; 370/353; 370/354; 370/355; 370/356; 370/395.54; 370/397; 370/401; 370/409

(58) Field of Classification Search
CPC ............ H04L 61/1511; H04L 61/1588; H04L 61/2503; H04L 61/2567; H04L 29/12066; H04L 29/1249
USPC .......... 709/227–228, 230, 245; 370/352–356, 370/397, 401, 409, 395.54
See application file for complete search history.

(56) References Cited

U.S. PATENT DOCUMENTS 6,108,704 A    8/2000  Hutton et al.
6,324,585 B1   11/2001 Zhang et al.
(Continued)

FOREIGN PATENT DOCUMENTS

WO    WO-2004043046 A1    5/2004

OTHER PUBLICATIONS

Arends, R. et al. "DNS Security Introduction and Requirements." Network Working Group. Mar. 2005. RFC4033. 22 pages.

(Continued)

*Primary Examiner* — Hitesh Patel
(74) *Attorney, Agent, or Firm* — Wilmer Cutler Pickering Hale and Dorr LLP

(57) ABSTRACT

In a system and method for establishing communications in a communications network, a network service provider can assign IP addresses to mobile devices dynamically to conserve IP address resources. A network service provider can also implement network address translation to further conserve IP address resources and to provide improved security. If a requestor seeks to obtain an IP address of a mobile device and the address is a local address, the system determines if the mobile device has a network address translation (NAT) binding that associates the IP address of the mobile device with a public IP address. If the mobile device does not have a NAT binding, the system creates a NAT binding that associates the IP address of the mobile device with a public IP address.

17 Claims, 7 Drawing Sheets

(56) References Cited

U.S. PATENT DOCUMENTS

| | | | |
|---|---|---|---|
| 6,427,170 | B1 | 7/2002 | Sitaraman et al. |
| 6,526,450 | B1 | 2/2003 | Zhang et al. |
| 6,944,167 | B1 | 9/2005 | McPherson |
| 7,062,562 | B1 | 6/2006 | Baker et al. |
| 7,447,162 | B1 | 11/2008 | Leung et al. |
| 7,472,201 | B1 | 12/2008 | Aitken |
| 7,523,170 | B1 | 4/2009 | Allen et al. |
| 7,886,075 | B2 | 2/2011 | Molteni et al. |
| 8,661,146 | B2 | 2/2014 | Alex et al. |
| 2003/0065785 | A1 | 4/2003 | Jain |
| 2007/0032232 | A1* | 2/2007 | Bleckert et al. ............... 455/433 |
| 2008/0005312 | A1 | 1/2008 | Boss et al. |
| 2008/0098084 | A1 | 4/2008 | Volz et al. |
| 2008/0133760 | A1* | 6/2008 | Berkvens et al. ............ 709/228 |
| 2009/0016369 | A1* | 1/2009 | Banerjee et al. ............. 370/408 |
| 2009/0129301 | A1* | 5/2009 | Belimpasakis ............... 370/310 |
| 2010/0070639 | A1 | 3/2010 | Hoggan |
| 2010/0124191 | A1 | 5/2010 | Vos et al. |
| 2011/0047256 | A1 | 2/2011 | Babu et al. |
| 2011/0142015 | A1 | 6/2011 | Shaikh et al. |
| 2011/0252469 | A1 | 10/2011 | Cho et al. |
| 2012/0052859 | A1 | 3/2012 | Cai et al. |

OTHER PUBLICATIONS

Eastlake, D. "Secure Domain Name System Dynamic Update." Network Working Group. Apr. 1997. RFC2137. 12 pages.

Gulbrandsen A. et al. "A DNS RR for Specifyina the Location of Services (DNS SRV)." Network Working Group. Feb. 2000, RFC2782, 13 pages.

International Search Report and Written Opinion for International Patent Application No. PCT/US2012/058973 mailed Jan. 21. 2013. 11 pages.

Meyer, David. "The Locator Identifier Separation Protocol (LISP)" The Internet Protocol Journal, vol. 11, No. 1. Cisco Systems. Accessed Dec. 1, 2011. 6 pages.

Srisuresh, P. et al. "DNS Extensions to Network Address Translators (DNS_ALG)," Network Working Group. The Internet Society. Sep. 1999. 30 pages.

Vixie, P. et al. "Dynamic Updates in the Domain Name System (DNS Update)." Network Working Group. Apr. 1997. RFC2136. 27 pages.

* cited by examiner

APPARATUS, SYSTEMS, AND METHODS FOR IP REACHABILITY IN A COMMUNICATIONS NETWORK

CROSS-REFERENCE TO RELATED APPLICATIONS

This application is a continuation application of U.S. patent application Ser. No. 13/273,039, entitled "SYSTEMS AND METHODS FOR IP REACHABILITY IN A COMMUNICATIONS NETWORK," filed Oct. 13, 2011, which is hereby incorporated by reference herein in its entirety.

FIELD OF THE DISCLOSURE

This disclosure relates generally to a system and method for determining an IP address of a mobile device and providing network address translation services in a communications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many mobile devices, including, for example, satellite communications systems, portable digital assistants (PDAs), laptop computers, and mobile devices (e.g., cellular telephones, user equipment). Such devices can connect to a network (e.g., the Internet) as long as the user is within range of such a wireless communication technology. Mobile devices are assigned an address that serves as a unique identifier within the network.

DESCRIPTION OF EXAMPLE EMBODIMENTS

Overview

Figure 1:
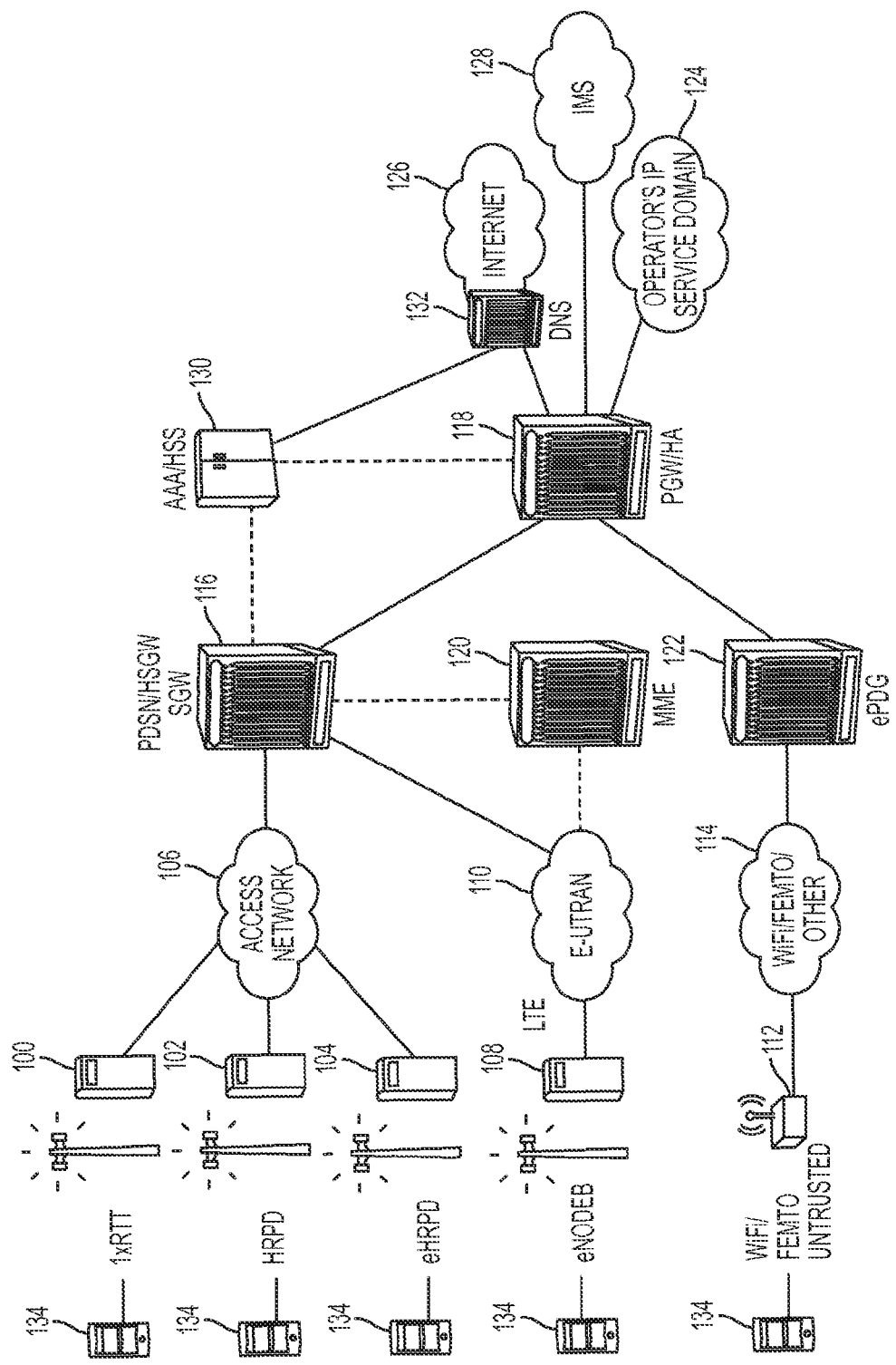
FIGS. 1-2 illustrate communications networks including a long term evolution (LTE) topology in accordance with some embodiments.

Certain embodiments disclose a method of establishing communication in a communications network. The method comprises receiving, at a gateway, a DNS query from a requestor, wherein the domain name system (DNS) query requests an Internet Protocol (IP) address of a mobile device for establishing communication with the mobile device over a communications network, determining if the IP address of the mobile device is available at the gateway, and if so, determining if the IP address of the mobile device is a local address that should be network address translated for communication with the requestor. If the IP address of the mobile device is not a local address, the method comprises sending, to the requestor, a positive response that includes the IP address of the mobile device. However, if the IP address of the mobile device is a local address, the method comprises further determining if the mobile device has a network address translation (NAT) binding that associates the IP address of the mobile device with a public IP address. If the mobile device does not have a NAT binding, the method comprises creating a NAT binding that associates the IP address of the mobile device with a public IP address. The method further comprises sending, to the requestor, a positive response that includes the public IP address associated with the IP address of the mobile device.

Example Embodiments

A large number of devices, including computers, cell phones, printers, traffic lights, and even refrigerators and cars, communicate amongst themselves over a communications network. The communications network associates each device with an internet protocol (IP) address so that, just as one person would call another person by dialing the other person's phone number, one device (i.e., requestor) can communicate with another device (i.e., recipient) by sending a communication request to the recipient's IP address.

In a certain type of network connections, the IP address assignment is static. In other words, the IP address assigned to each device does not change over time. Therefore, once a requestor identifies the IP address of a recipient, the requestor can use the same IP address to communicate with the recipient at any point in time. A "static" network essentially maintain a single, permanent IP address database (or a single, permanent Yellow page) to keep track of which device is associated with which IP address. Despite the simple bookkeeping strategy, a static network can be impractical for large networks because the total number of devices that can be attached to a static network is limited. This total number is limited by the number of bits used to represent an IP address, which is 32 bits for IPv4 and 64 bits for IPv6.

One way to address the dearth of IP addresses is to dynamically assign IP addresses. Suppose that a device is assigned an IP address, but the device later detaches from the network. Under the dynamic IP address allocation scheme, the network can recycle the IP address assigned to the detached device and re-assign the recycled IP address to a different, attached device. A network implementing the dynamic IP address allocation scheme is called a dynamic network. To keep track of which device is associated with which IP address, a dynamic network can maintain a time-dependent IP address database (or a time-dependent Yellow page) that is updated to reflect the most current network configurations. When a requestor wants to communicate with a recipient, the requestor can consult the IP address database to determine the recipient's IP address and use that IP address to establish communication with the recipient.

A drawback using an address database in a dynamic network is that it needs to be updated every time a new device is added to the network or every time a device is detached from the network. Because a network is often associated with a large number of devices, communications overhead associated with updating the address database can quickly become prohibitive. This is especially wasteful since some entries in the address database may not even be requested. Furthermore, whenever a requestor wants to communicate a recipient, the requestor needs to consult the address database, even if the requestor communicated with the recipient not too long ago. The communication bandwidth overhead and the delay overhead of using an address database in a dynamic network can be significant when compared to a static network, which does not have to update the address database as often.

Some of these drawbacks can be addressed using a network address translation (NAT) scheme. In a NAT scheme, a network is divided into two tiers: a public network and a private network. For example, the public network can be the Internet, and the private network can be a Local Area Network (LAN). Each device in a public network is assigned an IP address that is unique across the entire public network. This public IP address is often assigned dynamically, but can be assigned statically. On the other hand, each device in a private network is assigned a unique, static IP address that does not change over time. Therefore, if devices in the same private network communicate with each other frequently, each device can cache the IP address of the counter party and use the cached IP address for future communications, which is not possible with a dynamic network. The static IP assignment within the private network eliminates the communication bandwidth overhead and the delay overhead associated with a dynamic network. However, as a compromise, the IP address of the private network is unique only within the private network. In other words, this IP address of the private network cannot be used to communicate with devices outside of the private network because another device could be using the same IP address outside of the private network.

To enable communication between devices residing in different private networks and the public network, private networks are interfaced to the public network through NAT devices. For example, when a requestor residing in a private network wants to communicate with a recipient residing in the public network, the requestor sends a communication request to the recipient over the NAT device. The communication request includes the source IP address and the destination IP address, the source IP address being the local IP address of the requestor and the destination IP address being the public IP address of the recipient. However, as mentioned earlier, the requestor's IP address is only unique within the private network.

Therefore, before the communication request is transmitted across the public network, the NAT device (1) associates the requestor's local IP address with a public IP address that can be used for communication over the public network, (2) replaces the local source IP address of the communication request with the associated public IP address, and (3) generates an entry in an address translation table to keep track of the fact that the requestor's local IP address is associated with the assigned public IP address. These entries in the address translation table are called NAT bindings. Subsequently, when the NAT device receives a message from the public network to the requestor, the NAT device uses the address translation table to translate the message's destination IP address to the requestor's local IP address. This way, a two-way communication across a public network and private networks can be established. An IP address that needs to be network-address-translated for communication over a public network is a local address; an IP address that does not have to be network-address-translated for communication over a public network is a public address.

One drawback of NAT is that a NAT binding cannot be created unless the communication is initiated by a device in the private network. When a requestor residing in a public network wants to send data to a recipient in a private network, the requestor would have to send data to a public IP address associated with the local address of the recipient. However, if the local address does not have a NAT binding, there is no public IP address to which requestor can send data to establish communication. Therefore, unless the communication is initiated by a device in the private network, the two devices cannot establish communication.

These network characteristics are also applicable to a mobile IP network. A mobile IP network provides Internet services to mobile devices such as cell phones. A mobile IP network assigns an IP address to each mobile device. The assigned IP address can be a static IP address or a dynamic IP address, depending on how the mobile IP network manages its IP addresses. The assigned IP address can be a public IP address that is unique on the entire public network or it can be a local IP address that is unique only within a private network. Oftentimes, a mobile IP network dynamically allocates IP addresses for efficient resource utilization.

Although all the challenges associated with a dynamic, network-address-translated (NAT'ed) network are also applicable to a mobile IP network, a mobile IP network has some structures that can be leveraged to efficiently address these challenges. For example, mobile devices are anchored at a gateway. Therefore, if a mobile device is attached to the network, the gateway is aware of the mobile device's identification and its IP address. Also, if the network implements NAT, this functionality is often implemented at a gateway. Furthermore, gateway binding information, which specifies the gateway that served the mobile device when the mobile device was most recently to the network, is maintained at a home subscription server (HSS). The disclosed systems and methods exploit these characteristics of a mobile IP network to address challenges associated with a dynamic IP allocation scheme and a NAT scheme.

At a high level, when a requestor wants to establish communication with a recipient, the requestor might need to know (1) whether the recipient is attached to the network, and (2) if attached, what the recipient's IP address is. To find the information, the requestor can send an address resolution request to a domain name system (DNS) server. The address resolution request can be a DNS query, but can be any message that includes, explicitly or implicitly, a mobile device identifier of the recipient. When a DNS server receives the request, the DNS server retrieves the gateway binding information and instructs the requestor to send the address resolution request to the gateway specified in the gateway binding information.

The requestor would then send another address resolution request, this time to the gateway specified by the DNS server. If the specified gateway can resolve the IP address of the recipient, then the specified gateway can send the recipient's IP address to the requestor. If not, the specified gateway can find another gateway that has a higher chance of resolving the IP address and help the requestor resolve the requested IP address with that gateway. The specified gateway can help the requestor in one of the following two ways. In the first mode of operation, called the recursive mode, the specified gateway can send the address resolution request to a new gateway on behalf of the requestor, until the requested IP address is resolved. In the second mode of operation, called the iterative mode, the specified gateway can instruct the requestor to send another address resolution request to a new gateway. In this mode, the requestor would then send an address resolution request to the newly specified gateway. These operations are performed iteratively until the requestor receives the IP address of the recipient or until the requestor receives a response that the recipient is not available for communication. If the requestor receives the IP address of the recipient, the requestor can establish communication with the recipient. These operations are called the gateway-based address resolution operations.

The gateway-based address resolution operations are, in some ways, similar to how DNS queries are handled by DNS servers. However, the gateway-based address resolution operations are different in that the address resolution requests are recursively resolved by gateways, not DNS servers. By enhancing gateways with DNS server functionalities, the mobile IP network does not have to maintain an address database. This is especially attractive for a dynamic mobile IP network because, otherwise, the address database would have had to be constantly updated, leading to a communication bandwidth overhead and a delay overhead.

During address resolution, if the gateway realizes that the recipient resides in a private network, the gateway can (1) associate the recipient's local IP address with a public IP address, and (2) create a NAT binding entry in an address translation table that binds the recipient's local IP address to the associated public IP address, and (3) send the associated IP address to the requestor. This way, all future communications directed to the associated public IP address can be redirected to the recipient. Therefore, the requestor can establish communication with a recipient in a private network even if a NAT binding for the recipient does not exist. This feature is particularly useful for data push services. Using this feature, an application server can push data to a mobile device in a private network even if the mobile device does not yet have a NAT binding.

FIG. 1 illustrates a communications network that implements a gateway-based address resolution mechanism in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology, can use a transceiver shown generally at 112 to connect a mobile device, also called a user equipment (UE) 134, to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WiFi/Femto/other transceiver 112. On the packet core side, the anchor gateway can communicate with the operator's IP service domain 124, the internet 126, IP multimedia subsystem (IMS) 128, and a domain name system (DNS) server 132. An authentication, authorization, and accounting (AAA) server/home subscriber server (HSS) 130 can communicate with the access gateway 116, the anchor gateway 118, or both.

A DNS server 132 implements a Domain Name System (DNS) to translate an Internet domain name to an IP address. More particularly, the DNS can be used to map domain names of hosts and clients on the Internet to their corresponding IP addresses. Such translation enables the mobile IP network to attach easy-to-remember domain names (e.g., "domainname-.org") to difficult-to-remember IP addresses (e.g., "200.140.130.120"). Since a central list of domain name-IP address mappings would be impractical, such lists are often distributed throughout the Internet in various DNS servers. By way of example, a client typically sends a DNS query to a DNS server that includes a hostname with an indication that an IP address is requested. The DNS server would then return an IP address associated with the hostname. The DNS server 132 can communicate with the HSS 130 over any one of the following interfaces: a Diameter Sh interface, an interface that implements standardized protocols including a lightweight directory access protocol (LDAP) and an Authorization, Authentication, and Accounting (AAA) protocol, or a proprietary interface between the DNS server 132 and the HSS 130.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a mobile device. Even when the mobile device is detached from the network, the HSS 130 maintains the binding information until the mobile device re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communications network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/ offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
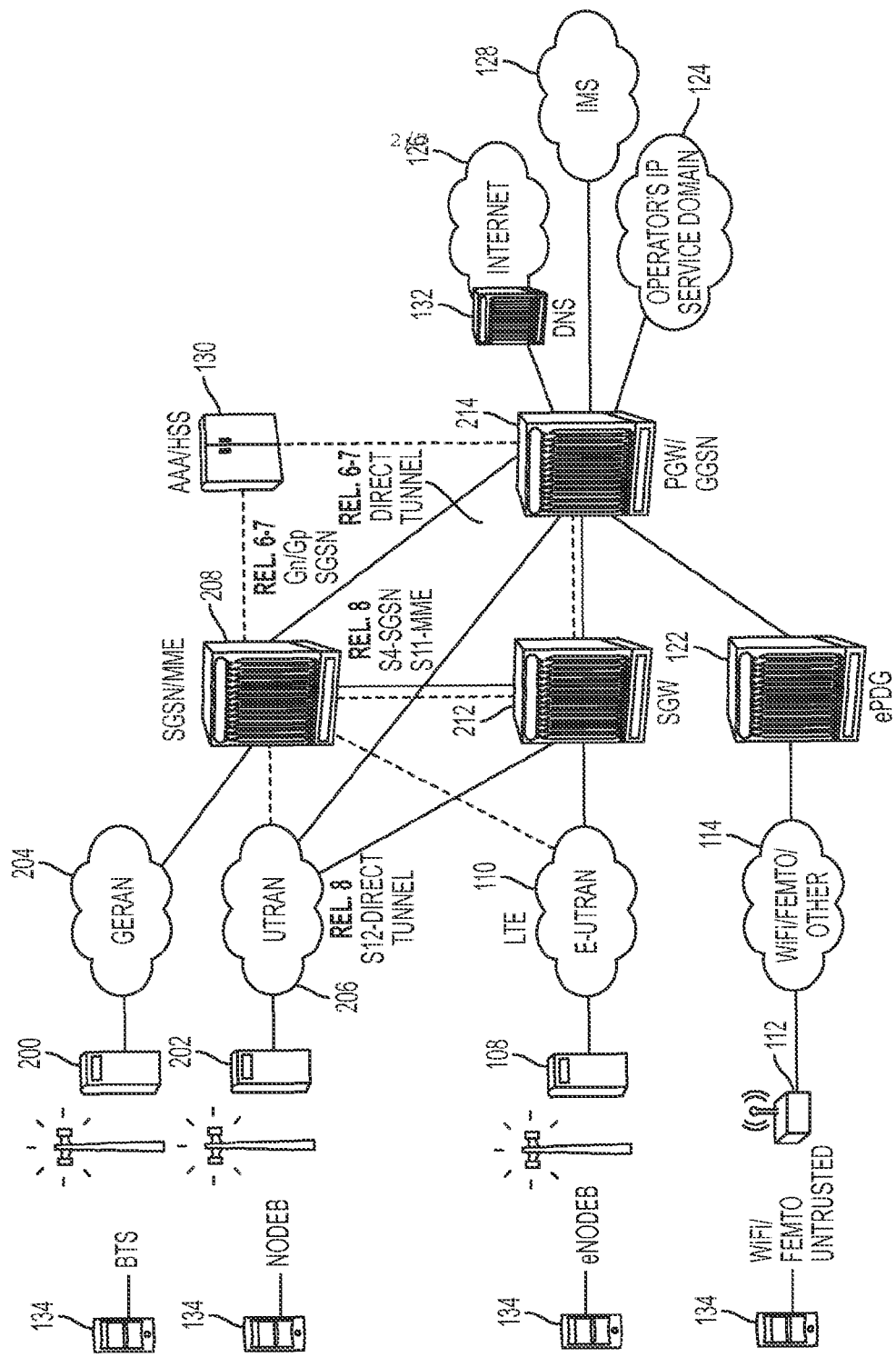

FIG. 2 illustrates a communications network that implements a gateway-based address resolution mechanism in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the gateway-based address resolution operations can be implemented on gateways, such as PGW/HA 118, PDSN/HSGW/SGW 116, SGSN/MME 208, PGW/GGSN 214, or SGW 212. The gateways can access and maintain information relating to the communication session, the subscriber, the radio bearers, and the policies relating to the communication session. The gateways may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communications networks also allow provision of applications such as VoIP, streaming video, streaming music, multi-user gaming, location based services, and a variety of content delivered to a mobile node. Residing within the gateways can be one or more network processing units, line cards, as well as packet and voice processing cards.

In some embodiments, gateways can be enhanced with a DNS module that is configured to handle DNS queries. Also, in some embodiments, the DNS modules in gateways can be configured in a hierarchical manner so that the IP address of a hostname can be resolved recursively or iteratively, similar to that of a regular DNS.

Figure 3:
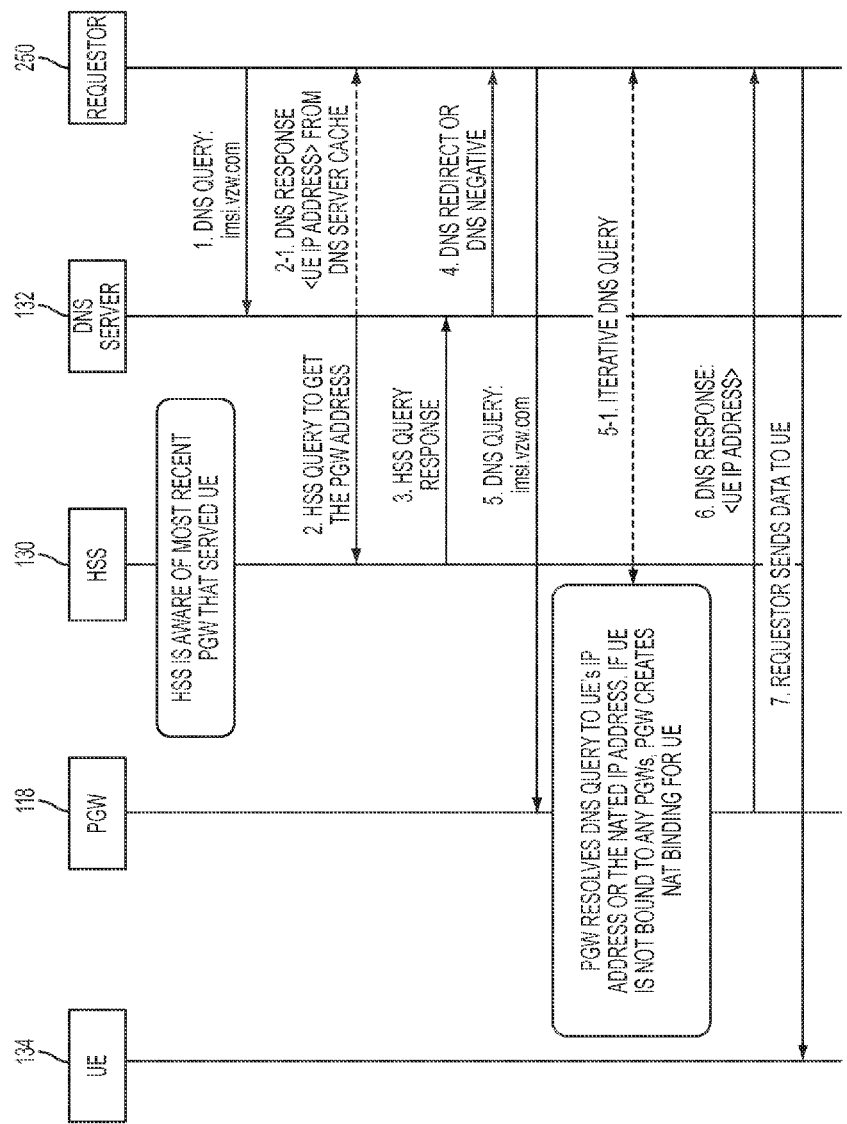
FIG. 3 illustrates a system and method for IP reachability in accordance with certain embodiments.

FIG. 3 illustrates a gateway-based address resolution scheme in accordance with certain embodiments. In a mobile IP network, if the UE 134 had been attached to the network, the HSS 130 can maintain gateway binding information for the UE 134. The gateway binding information associates the mobile device identifier of the UE 134 with the IP address of the PGW 118 that most recently anchored the UE 134. The HSS 130 can maintain the gateway binding information in a gateway binding table, with a first column of the binding table for mobile device identifiers of UEs, and a second column of the binding table for the IP address of PGWs. If the UE 134 had never been attached to the network, the binding table would not have an entry for the UE 134.

In FIG. 3, a requestor 250 wants to initiate communication with a UE 134. The requestor 250 can be another UE residing in the network, or an application server that wants to push data to the UE 134. In order to initiate communication, the requestor 250 might need to know (1) whether the UE 134 is attached to the network, and (2) if the UE 134 is attached to the network, the IP address assigned to the UE 134. Therefore, the requestor 250 initiates the gateway-based address resolution operations to find out the status and the IP address of the UE 134.

In step 1, to initiate gateway-based address resolution, the requestor 250 can send an address resolution request to a DNS server 132. The address resolution request can include (1) the mobile device identifier of the UE 134 and (2) an indication that the IP address of the hostname is requested. The mobile device identifier can be any one of the following: International Mobile Equipment Identity (IMEI), International Mobile Subscriber Identity (IMSI), Temporary Mobile Subscriber Identity (TMSI), Mobile Equipment Identifier (MEID), Mobile Subscriber Integrated Services Digital Network Number (MSISDN), or any identifier that uniquely identifies the UE within the network. In certain embodiments, the address resolution request can be a DNS query which includes (1) the hostname of the UE 134 and (2) an indication that the IP address of the hostname is requested. The hostname of the UE 134 can be constructed from (1) the mobile device identifier of the UE 134 and (2) the domain in which the UE 134 resides in. For example, if the mobile device identifier of the UE 134 is "imsi" and if the UE 134 resides in "vzw.com", then the hostname for the UE 134 is "imsi.verizon.com".

In step 2, when the DNS server 132 receives the DNS query, the DNS server 132 can first check whether the requested IP address is readily available from its cache. If the requested IP address is available from its cache, the DNS server 132 can retrieve that IP address and send it to the requestor 250 (step 2-1). If the cache in the DNS server 132 does not have the IP address associated with the hostname, the DNS server 132 can send a HSS query to the HSS 130. The HSS query requests the HSS 130 to return the IP address of the PGW that most recently served the UE 134. The HSS query can include the mobile device identifier of the UE 134. The DNS server 132 can send the HSS query to the HSS 130 over any one of the following interfaces: a Diameter Sh interface, an interface that implements standardized protocols including a lightweight directory access protocol (LDAP) and an Authorization, Authentication, and Accounting (AAA) protocol, or a proprietary interface between the DNS server 132 and the HSS 130.

In step 3, the HSS 130 sends a HSS query response to the DNS server 132. The HSS query response can include (1) a flag bit indicating whether or not the UE 134 was ever attached to the network, and (2) if the UE 134 was ever attached to the network, the IP address of the PGW that most recently served the UE 134. In step 4, the DNS server 132 analyzes the received HSS query response. If the HSS query response indicates that the UE 134 was never attached to the network, the DNS server 132 can send a DNS negative response to the requestor 250. The DNS negative response indicates that the UE 134 is not attached to the network and is not available for communication. If the HSS query response indicates that the UE 134 was at least once attached to the network and includes the IP address of the PGW 118, the DNS server 132 sends a DNS redirect message to the requestor 250. The DNS redirect message includes the IP address of the PGW 118 that was included in the HSS query response.

In step 5, if the requestor 250 received the DNS redirect message, the requestor 250 can send another DNS query to the PGW 118 specified in the DNS redirect message. The PGW 118 can include a DNS module that is configured to resolve DNS queries. The DNS module can include a DNS cache that maintains the IP address of recently resolved UE addresses. To resolve the IP address of a hostname, the DNS module 306 can (1) check the DNS cache to determine if the cache maintains the IP address for the requested hostname or (2) determine an attachment status of the mobile device that indicates whether the UE corresponding to the hostname is currently attached to the network and is anchored at the gateway 300. If the DNS module finds the requested IP address, the DNS module can send a DNS response with the identified IP address.

If the DNS module cannot resolve the DNS query, the DNS module can find another gateway (or its DNS module) that has a higher probability of handling the DNS queried host name. To do so, the DNS module can maintain a mapping table that indicates which gateway would be able to resolve the DNS query. Also, if the host name in the DNS query includes more granular location information of the UE, for example, the region name in the fully qualified domain name (FQDN) (e.g., imsi@region1.eastarea.vzw.com,) then the DNS module can use that information to determine which gateway could most likely resolve the DNS query. In certain embodiments, the gateways within a predetermined region can share the information on which UEs are being served by each gateway.

The DNS module can support a recursive DNS mode and/or an iterative DNS mode for IP address resolution. In a recursive DNS mode, the DNS module can operate as a DNS resolver that recursively sends DNS queries to other PGWs on behalf of the requestor 250 until the requested IP address is resolved. In an iterative DNS mode, the PGW 118 can send a DNS redirect message to the requestor 250 so that the requestor 250 can recursively send DNS queries to PGWs until the UE's IP address is resolved (i.e., step 5-1). If the PGW 118 cannot resolve the requested IP address and cannot find the PGW 118 that has a higher probability of having access to the requested IP address, the PGW 118 returns a DNS negative response to the requestor 250, indicating that the UE 134 is not attached to the network or that the UE 134 is temporarily out of reach.

Figure 4:
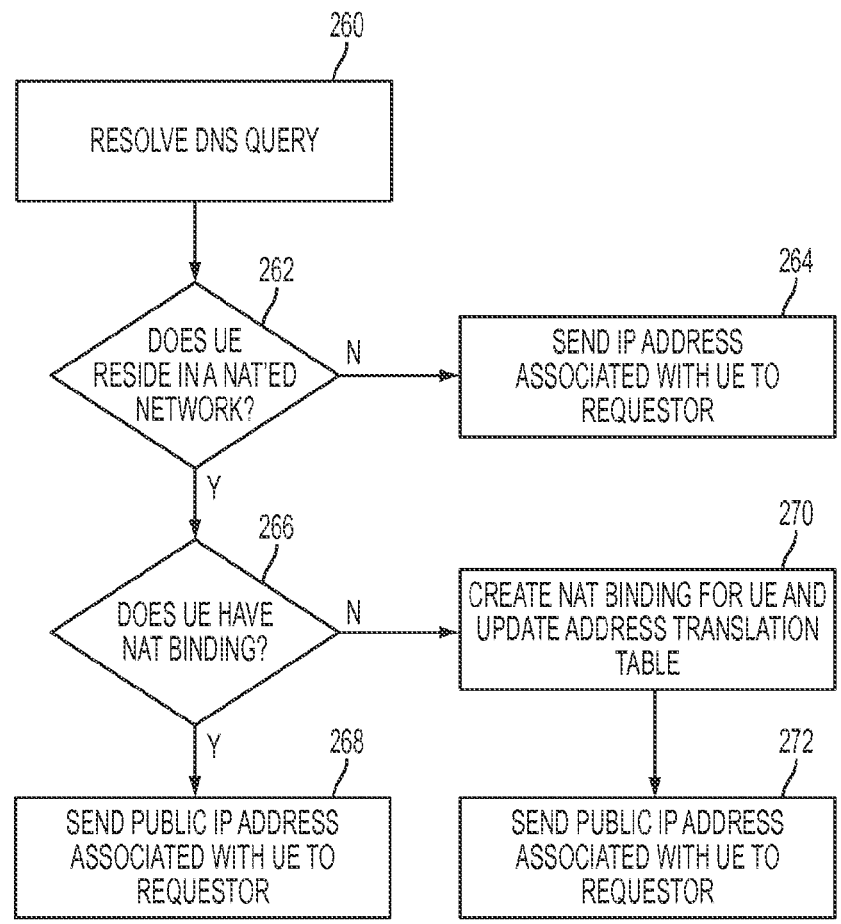
FIG. 4 shows a flow diagram illustrating the operation of a packet gateway (PGW) in accordance with certain embodiments.

FIG. 4 illustrates step 6 of FIG. 3 in accordance with certain embodiments. In step 6, the PGW 118 resolves the DNS query and sends the IP address of the UE 134 to the requestor 250. In 260, the PGW 188 resolves the DNS query. In 262, if the UE 134 is operating in a non-NAT'ed network, then the PGW 118 can send the IP address associated with the UE 134, as shown in 264. If the UE 134 is operating in a NAT'ed network, then the PGW 118 checks whether the UE 134 has a NAT binding with a public IP address. To determine whether the UE 134 has a NAT binding, the PGW 118 can search the address translation table for a NAT binding entry associated with the UE's local IP address. In 266, if the UE 134 has a NAT binding, then in 268, the PGW 118 would send a DNS positive response with the public IP address bound to the UE 134. If the UE 134 does not have any NAT bindings, then, as shown in 270 and 272, the PGW 118 can (1) create a NAT binding for the UE 134, (2) generate a NAT binding entry in an address translation table, and (3) send a DNS positive response that includes the UE's public IP address to the requestor 250. Thus, even when a UE does not have a NAT binding, a requestor residing outside of the private network can communicate with the UE. Referring back to FIG. 3, in step 7, the requestor 250 receives the DNS positive response and uses the IP address in the DNS response to transmit data to the UE 134.

In certain embodiments, the NAT binding entry in the address translation table can be associated with an expiration timer (also called a time-to-live (TTL) timer.) If a NAT binding entry is not used for a fixed period of time (i.e., the expiration period), then the NAT binding can expire and can be removed from the address translation table.

In certain embodiments, the PGW 118 can create an application-level NAT binding. A DNS query can include, in addition to the hostname of the recipient, an application identifier that identifies the application sending the query. When the PGW 118 receives a DNS query with an application identifier, the PGW 118 can create a NAT binding that associates the UE's local IP address with the public IP address assigned to the UE and the particular application sending the DNS query. This way, the PGW 118 can block unwanted, malicious data transfers from another application, such as a malware, running on the same requestor 250. The application-level NAT binding information can also be stored in an address translation table and can be associated with an expiration timer.

In some embodiments, a UE can have multiple IP addresses. For example, in a Long Term Evolution (LTE) network, a UE can have two IP addresses, one for IPv4 and another for IPv6. Therefore, a PGW responding to a DNS query may not know which one of the two addresses should be sent to the requestor. To resolve this issue, a requestor can include, in the DNS query, the type of address the requestor is looking for, which would specify the access point name (APN). Therefore, the DNS server or the PGW can analyze the DNS query to determine the type of address the requestor is looking for. However, if the DNS query does not specify the type of address being sought or if a UE has multiple addresses of the same type, the DNS server can look up its database of APN-to-PGW bindings so that the DNS server redirects the DNS queries to the PGW.

In another embodiment, the PGW 118 can create a NAT binding with port information, which is also called a network address and port translation (NAPT) binding. Using NAPT, the PGW 118 can anchor more mobile devices than the number of public network IP addresses the PGW 118 is eligible to use. However, NAPT has a challenge similar to a regular NAT in that a NAPT binding needs to be created by a device in the private network before a device in a public network can communicate with the device in the private network. This issue can be addressed using the gateway-based address resolution scheme. In step 6 of FIG. 3, if the UE 134 does not have a NAPT binding, the PGW 118 can create a NAPT binding and generate a NAPT binding entry in the address translation table. The NAPT binding entry associates the local IP address of a UE with (a) a public IP address, and (b) a unique port assigned to the UE 134 at the PGW 118 for this communication. The port information can be retrieved from existing or enhanced service records (SRV records). The PGW 118 then responds to the DNS query by sending a DNS response that includes the public IP address and the unique port assigned to the UE 134. The NAPT binding entry can also be associated with an expiration timer.

The PGW 118 can be configured to provide DNS service to only authorized requestors. In one embodiment, the PGW 118 can maintain a blacklist of requestors that are not authorized to retrieve IP addresses of recipients. If the PGW 118 receives a DNS query from a requestor on the blacklist, the PGW 118 can ignore the query or send a DNS negative response that the recipient is not available for communication. In another embodiment, the PGW 118 can maintain a whitelist, where only those on the whitelist can retrieve IP addresses of recipients through DNS queries. If the PGW 118 receives a DNS query from a requestor on the whitelist, the PGW 118 can resolve the DNS query and send a DNS response to the requestor; if the PGW 118 receives a DNS query from a requestor that is not on the whitelist, the PGW 118 can ignore the query or send a DNS negative response that the recipient is not attached to the network. In certain embodiments, a requestor is not authorized to retrieve IP addresses of recipients unless the requestor communicates over an authorized Application Programming Interface (API.) The authorized API can allow Diameter queries to the HSS 130 or an Extensible Markup Language (XML) queries to the PGW 118.

In certain embodiments, DNS service requestors can be charged for a DNS query, which can potentially stop spammers and Distributed Denial of Service (DDOS) attackers from pushing malicious spam data to mobile devices. When a PGW 118 receives a DNS query from a requestor and creates a NAT binding in response to the DNS query, the creation of the NAT binding can serve as a trigger to charge the requestor. Furthermore, the PGW 118 can also apply any special charging schemes that are locally configured on the PGW 118.

Figure 5:
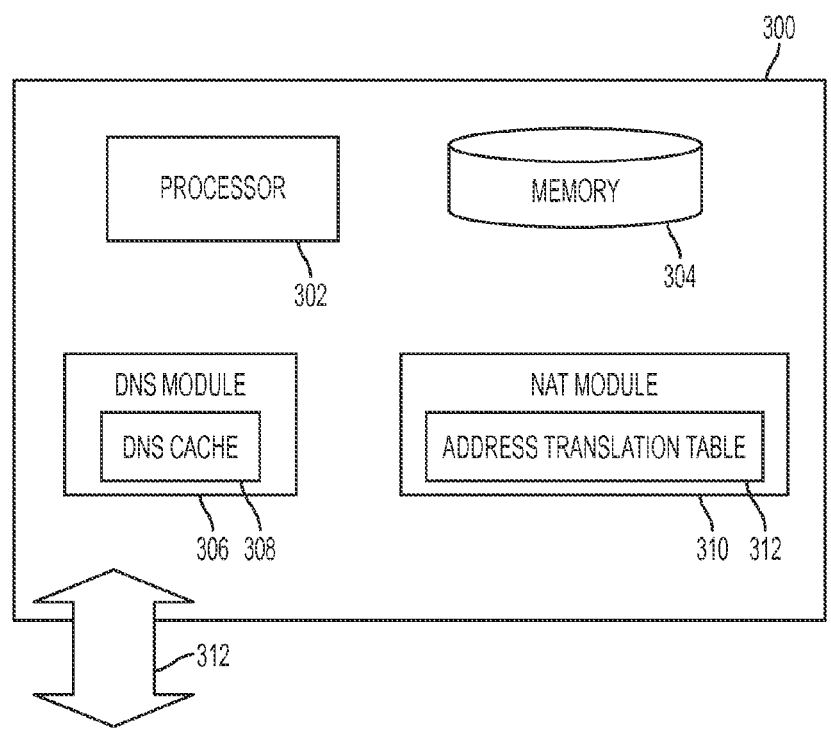
FIG. 5 illustrates a logical view of gateway in accordance with certain embodiments.

FIG. 5 illustrates a logical view of a gateway 300 in accordance with certain embodiments. The gateway 300 can include a processor 302, a memory 304, a Domain Name System (DNS) module 306, a DNS cache 308, a network address translation (NAT) module 310, an address translation table 312, and an interface 314.

A DNS module 306 can provide DNS server functionalities at the gateway 300. The DNS module 306 can resolve a DNS query to find an IP address associated with a hostname identified in the DNS query. The DNS module 306 can include a DNS cache 308 that maintains IP addresses of recently resolved hostnames. To resolve the IP address of a hostname, the DNS module 306 can (1) check the DNS cache 308 to determine if the DNS cache 308 maintains the requested IP address or (2) determine whether the UE corresponding to the hostname is currently anchored at the gateway 300. If the DNS module 306 can find the IP address of the requested hostname, the DNS module 306 can send a DNS response with the identified IP address.

If the DNS module 306 cannot find the requested IP address, the DNS module 306 can find another gateway (or its DNS module) that has a higher probability of having access to the requested IP address. The DNS module 306 can support both a recursive DNS mode and an iterative DNS mode. In a recursive DNS mode, the DNS module 306 can operate as a DNS resolver that recursively sends new DNS queries to other gateways (or their DNS modules) on behalf of the requestor until the requested IP address is resolved. In an iterative DNS mode, the DNS module 306 can instruct the requestor to send the new DNS query to the gateway with a higher probability of having access to the requested IP address. The DNS module 306 can be implemented in software using the memory 304 such as a non-transient computer readable medium, a non-transitory computer readable medium, a programmable read only memory (PROM), or flash memory. The software can run on a processor 302 that executes instructions or computer code. The DNS module 306 may also be implemented in hardware using an application specific integrated circuit (ASIC), programmable logic array (PLA), or any other integrated circuit.

A NAT module 310 can provide network address translation for UEs anchored at the gateway 300. The NAT module 310 can create a NAT binding, which binds the local IP address of the UE with a public IP address, and store the NAT binding information in an address translation table 312. The address translation table 312 can reside in the gateway 300, but it can also be a stand-alone device. The NAT binding can be created when a UE, anchored at the gateway 300, initiates communication with another device in a public network, or when a device in a public network initiates communication with a UE anchored at the gateway 300. The NAT module 310 can maintain a blacklist of devices that should not be allowed to create a NAT binding with any of the UEs anchored at the gateway 300. The NAT module 310 can also maintain a whitelist of devices, where only those on the whitelist are allowed to create a NAT binding with UEs anchored at the gateway 300.

The NAT module 310 can create an application level NAT binding. An application level NAT binding binds UE's local IP address with an assigned public IP address and an application the UE is authorized to communicate with. An application level NAT binding can be created when the gateway 300 receives a DNS query with an identification of an application sending the DNS query. The application level NAT binding information can also be stored in the address translation table 312. The NAT module 310 and the address translation table 312 can be implemented in software using the memory 304 such as a non-transient computer readable medium, a non-transitory computer readable medium, a programmable read only memory (PROM), or flash memory. The software can run on a processor 302 that executes instructions or computer code. The NAT module 310 and the address translation table 312 may also be implemented in hardware using an application specific integrated circuit (ASIC), programmable logic array (PLA), or any other integrated circuit.

An interface 314 can provide an input and/or output mechanism to communicate with other network devices. The interface 314 can provide communication with DNS servers, application servers, and user equipment, as well as other core network nodes to send and receive control data. The interface 314 can be implemented in hardware to send and receive signals in a variety of mediums, such as optical, copper, and wireless, and in a number of different protocols some of which may be non-transient.

User Equipment and Gateway

The user equipment described above can communicate with a plurality of radio access networks using a plurality of access technologies and with wired communications networks. The user equipment can be a smart phone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communications network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a non-transient computer readable medium, a non-transitory computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway-based address resolution mechanism described above can be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The gateway-based address resolution mechanism can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 6:
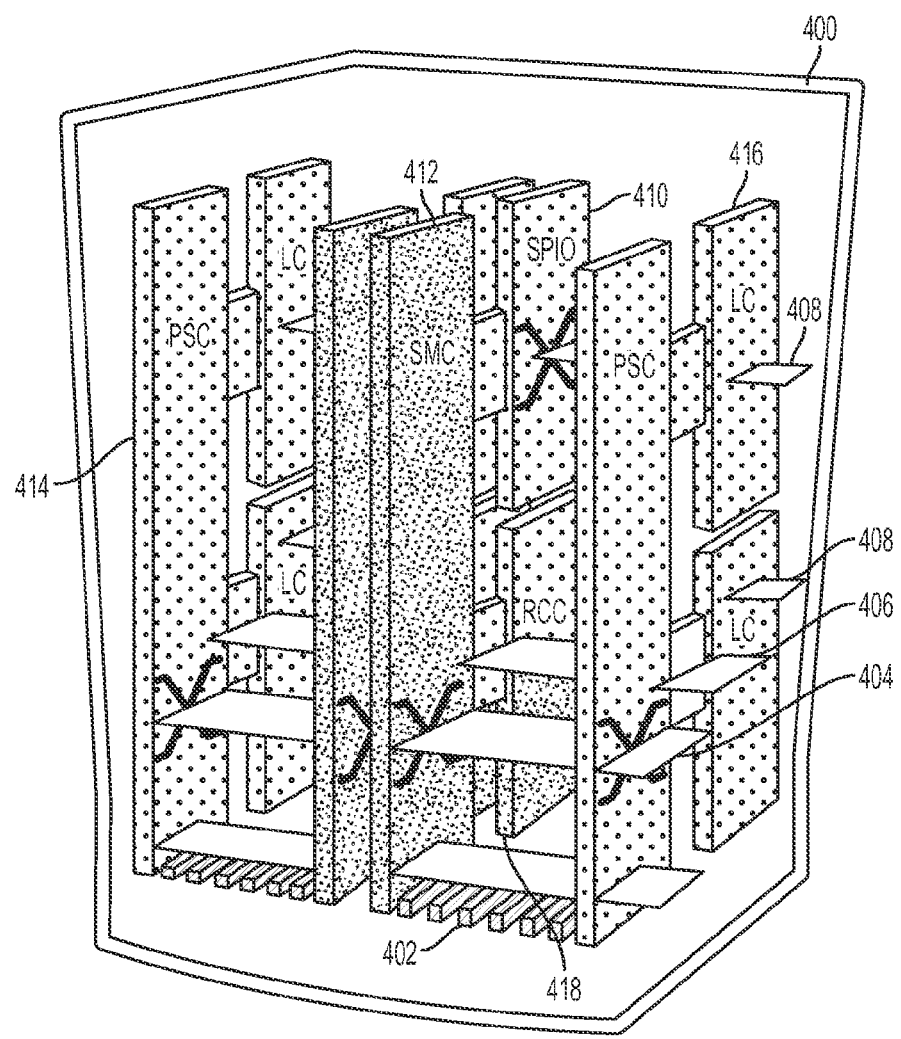
FIG. 6 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 6 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 7:
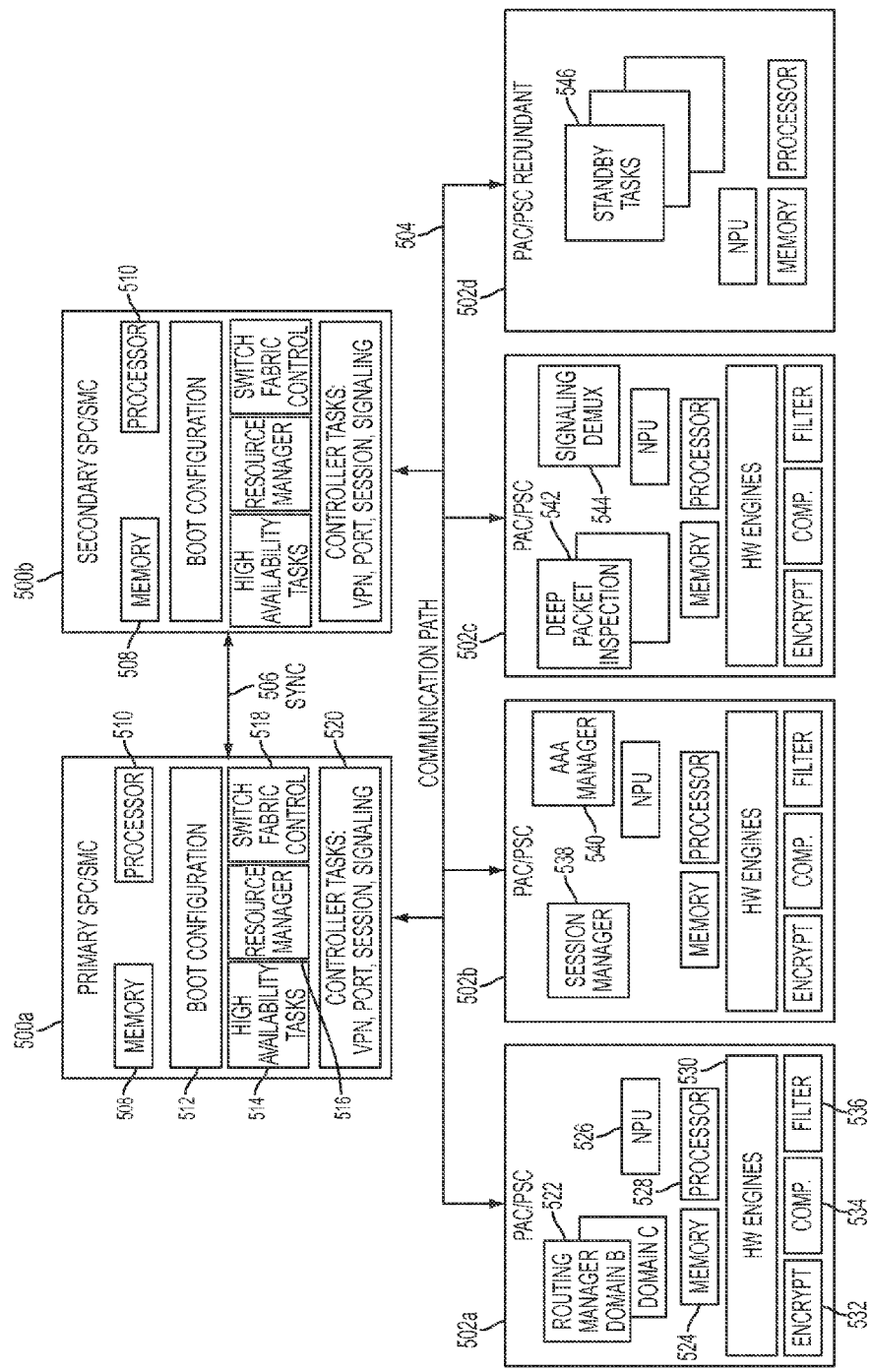
FIG. 7 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 7 illustrates a logical view of the software architecture of a network device in accordance with certain embodiments. As shown, the software and hardware can be distributed within the network device and across different circuit boards, processors, and memory. FIG. 7 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502*a* provides routing managers 522 with each covering routing of a different domain. PAC/PSC 502*b* provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502*d* provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, DNS queries from a requestor can be resolved at a SGW.

We claim:

1. A method comprising:
  receiving, at a gateway, a domain name system (DNS) query from a requestor, requesting an Internet Protocol (IP) address of a mobile device for establishing communication with the mobile device, wherein the gateway is configured to anchor a plurality of mobile devices for communication over a cellular network;

determining an attachment status of the mobile device indicating whether the mobile device is anchored at the gateway;

determining whether the DNS query can be resolved based on the attachment status of the mobile device; and upon a determination that the DNS query can be resolved based on the attachment status, determining the IP address of the mobile device based on the attachment status, wherein determining the IP address comprises:

determining an address of the mobile device based on the attachment status:

determining that the mobile device does not reside in a network-address-translated network; and identifying the address of the mobile device as the IP address of the mobile device, and sending, to the requestor, a response to the DNS query that includes the IP address of the mobile device to allow communication between the requestor and the mobile device.

2. The method of claim 1, wherein, when the mobile device is associated with a plurality of IP addresses, the method further includes analyzing the DNS query to select one of the IP addresses to be sent to the requestor.

3. The method of claim 2, wherein each of the plurality of IP addresses is associated with a unique type, and the DNS query indicates a type of IP address requested by the requestor.

4. The method of claim 1, wherein upon a determination that the DNS query cannot be resolved based on the attachment status, the method further includes initiating a DNS procedure for identifying the IP address of the mobile device.

5. The method of claim 4, wherein the DNS procedure includes a recursive DNS mode procedure.

6. The method of claim 4, wherein the DNS procedure includes an iterative DNS mode procedure.

7. The method of claim 1, wherein determining the IP address of the mobile device based on the attachment status comprises:

determining an address of the mobile device based on the attachment status;

determining that the mobile device resides in a network-address-translated network; and identifying the IP address associated with the address of the mobile device using a network address translation binding for the mobile device.

8. A gateway comprising:

one or more interfaces configured to provide communication with a requestor and a plurality of mobile devices;

a processor, in communication with the one or more interfaces, and configured to run one or more modules, stored in memory, such that the gateway is configured to:

receive, over the interface, a domain name system (DNS) query from the requestor, requesting an Internet Protocol (IP) address of a mobile device for establishing communication with the mobile device;

determine an attachment status of the mobile device indicating whether the mobile device is anchored at the gateway;

determine whether the DNS query can be resolved based on the attachment status of the mobile device; and upon a determination that the DNS query can be resolved based on the attachment status, determine the IP address of the mobile device based on the attachment status, which comprises:

determining an address of the mobile device based on the attachment status;

determining that the mobile device does not reside in a network-address-translated network; and identifying the address of the mobile device as the IP address of the mobile device, and send, to the requestor, a response to the DNS query that includes the IP address of the mobile device to allow communication between the requestor and the mobile device.

9. The gateway of claim 8, wherein, when the mobile device is associated with a plurality of IP addresses, the one or more modules are configured to analyze the DNS query to select one of the IP addresses to be sent to the requestor.

10. The gateway of claim 9, wherein each of the plurality of IP addresses is associated with a unique type, and the DNS query indicates a type of IP address requested by the requestor.

11. The gateway of claim 8, wherein upon a determination that the DNS query cannot be resolved based on the attachment status, the gateway is configured to initiate a DNS procedure for identifying the IP address of the mobile device.

12. The gateway of claim 8, wherein the gateway is configured to:

determine an address of the mobile device based on the attachment status;

determine that the mobile device resides in a network-address-translated network; and identify the IP address associated with the address of the mobile device using a network address translation binding for the mobile device.

13. A computer program product tangibly embodied in a non-transitory computer-readable storage medium, the computer program product including instructions operable to cause a data processing apparatus to:

receive, over the interface, a domain name system (DNS) query from the requestor, requesting an Internet Protocol (IP) address of a mobile device for establishing communication with the mobile device;

determine an attachment status of the mobile device indicating whether the mobile device is anchored at the gateway;

determine whether the DNS query can be resolved based on the attachment status of the mobile device; and upon a determination that the DNS query can be resolved based on the attachment status, determine the IP address of the mobile device based on the attachment status, which comprises:

determining an address of the mobile device based on the attachment status:

determining that the mobile device does not reside in a network-address-translated network; and identifying the address of the mobile device as the IP address of the mobile device, and send, to the requestor, a response to the DNS query that includes the IP address of the mobile device to allow communication between the requestor and the mobile device.

14. The computer program product of claim 13, wherein the instructions are operable to cause the data processing apparatus to analyze the DNS query to select one of the IP addresses to be sent to the requestor when the mobile device is associated with a plurality of IP addresses.

15. The computer program product of claim 14, wherein each of the plurality of IP addresses is associated with a unique type, and the DNS query indicates a type of IP address requested by the requestor.

16. The computer program product of claim 13, wherein the instructions are operable to cause the data processing apparatus to initiate a DNS procedure for identifying the IP address of the mobile device upon a determination that the DNS query cannot be resolved based on the attachment status.

17. The computer program product of claim 13, wherein the instructions are operable to cause the data processing apparatus to:
- determine an address of the mobile device based on the attachment status;
- determine that the mobile device resides in a network-address-translated network; and
- identify the IP address associated with the address of the mobile device using a network address translation binding for the mobile device.

* * * * *